United States Patent [19]

Mokuya et al.

[11] Patent Number: 4,563,112
[45] Date of Patent: Jan. 7, 1986

[54] SLURRY TRANSPORT SYSTEM

[75] Inventors: Kinji Mokuya, Yokohama; Isao Tsushima, Yamato; Masakatsu Sakamoto, Matsudo, all of Japan

[73] Assignee: Hitachi, Ltd., Tokyo, Japan

[21] Appl. No.: 722,439

[22] Filed: Apr. 15, 1985

Related U.S. Application Data

[63] Continuation of Ser. No. 505,712, Jun. 20, 1983, abandoned.

[30] Foreign Application Priority Data

Jun. 23, 1982 [JP] Japan ................... 57-106940

[51] Int. Cl.[4] .............................................. B65G 53/66
[52] U.S. Cl. ..................................... 406/11; 137/110; 137/599; 406/106
[58] Field of Search .................................. 406/10-15, 406/19, 106, 197; 137/110, 599

[56] References Cited

U.S. PATENT DOCUMENTS 3,719,397  3/1973  Wasp .............................. 406/197 X Primary Examiner—Jeffrey V. Nase
Attorney, Agent, or Firm—Antonelli, Terry & Wands

[57] ABSTRACT

A slurry transport system including a pipeline switching device mounted in pipelines so that when any abnormal condition exists in the slurry transport pipeline, the transport medium return pipeline can be used for transporting a slurry while using the slurry transport pipeline for returning transport medium to the point of origin.

3 Claims, 3 Drawing Figures

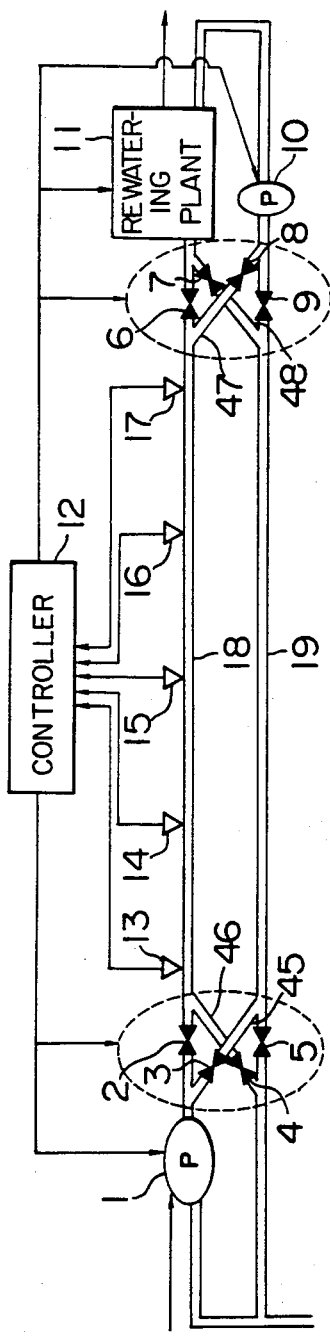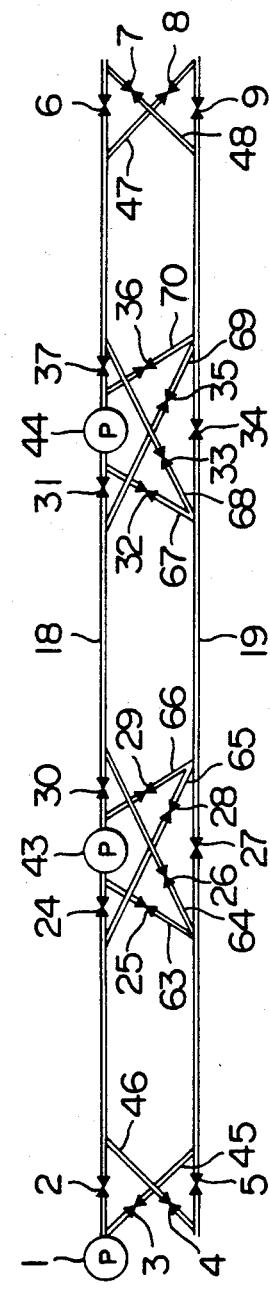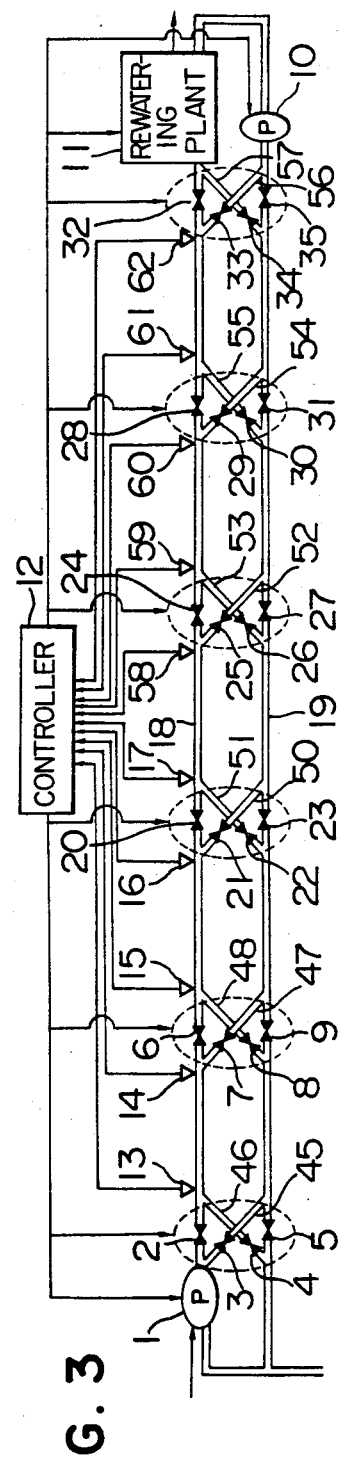

SLURRY TRANSPORT SYSTEM

This application is a continuation of application Ser. No. 505,712, filed June 20, 1983, now abandoned.

BACKGROUND OF THE INVENTION

This invention relates to slurry transport systems, and more particularly it is concerned with a slurry transport system capable of using two pipelines arranged parallel to each other alternately for the purposes of transporting a slurry and returning water by switching the pipelines.

In prior art slurry transport systems each employ a slurry transport pipeline for transporting a slurry therethrough and a return water pipeline for returning water removed from solids contained in the slurry after the slurry has reached its destination, with the slurry transport pipeline and the return water pipeline being usually constructed in a manner so as to use them exclusively for transporting a slurry and returning water which is a transport medium. Some disadvantages have been associated with the slurry transport systems of this construction.

More particularly, when the transport pipeline is blocked and transport of a slurry becomes impossible to perform, it would be impossible to transport a slurry until the blockage is removed and a normal condition is restored to the slurry transport pipeline.

Additionally in the prior art systems a return water pipeline is necessary for collecting the water after transmitting the slurry and returning it to its original point.

Furthermore, greater wear is caused on the transport pipeline for transporting the slurry than on the return water pipeline for returning the water because of the solids contained in the slurry. Thus, when the return water pipeline is used for transporting the slurry in place of the slurry transport pipeline reduced in wall thickness due to wear after several years in service, rearranging of pipelines would make it necessary to perform additional pipe laying operations.

Moreover, when abnormal conditions are sensed in the slurry transport pipeline which might cause blockage of the pipeline while a slurry transporting operation is being performed, slurry transport would have to be interrupted until the abnormal conditions in the pipeline are removed.

Also, when an attempt is made to flush water through the transport pipeline to remove solids accumulated on the bottom thereof which might cause blockage of the pipeline to occur, it would be necessary to interrupt the slurry transporting operation. The water flushed through the pipeline usually flows in the same direction as a slurry transported therethrough, so that the flushing would have little effect on these solids which are accumulated in positions from which they are difficulty removed by the flowing water.

SUMMARY OF THE INVENTION

This invention has been developed for the purpose of avoiding the aforesaid disadvantages of the prior art. Accordingly, the invention has as its object the provision of a slurry transport system provided with means for switching the pipelines which enables the slurry transport pipeline and the return water pipeline to be used for other purposes than those for which they are intended when an abnormal condition, such as rupture of the transport pipeline due to blocking or wear thereof, threatens to occur, to thereby enable the occurrence of the abnormal condition to be avoided or allow a normal condition to be restored quickly.

The outstanding feature of the invention enabling the aforesaid object to be accomplished is that pipelines switching means comprising pipes and valves are mounted at least in two positions or at opposite end portions of the pipelines, to enable the return water pipeline to be used as a slurry transport line and the slurry transport pipeline to be used as a return water pipeline by actuating the switching means in the event that an abnormal condition is sensed in the slurry transport pipeline.

BRIEF DESCRIPTION OF THE DRAWINGS

FIG. 1 is a schematic view of a short distance coarse coal slurry transport system incorporating therein one embodiment of the present invention;

FIG. 2 is a plan view of the pipelines of an embodiment of the slurry transport system in accordance with the present invention which are provided with buster pumps; and FIG. 3 is a systematic view of a short distance coarse coal slurry transport system incorporating therein another embodiment of the present invention.

DETAILED DESCRIPTION

Preferred embodiments of the invention will now be described by referring to the accompanying drawings.

Referring now to the drawings wherein like reference numerals are used throughout the various views to designate like parts and, more particularly, to FIG. 1, according to this figure a short distance coarse coal slurry transport system having no buster pumps for transporting a slurry located midway in the pipelines, has a coarse coal slurry fed to a slurry pump 1 which supplies the slurry through a transport pipeline 18 to a rewatering plant 11 at the destination where solids or coarse coal contained in the slurry is separated from water serving as a transporting medium. The coal is conveyed to a transport ship and the water is returned by a return water pump 10 to the point of origin through a return water pipeline 19, for recycling.

Pipeline switching means include connecting pipes 45-48, connecting together the slurry transport pipeline 18 and the transport medium return pipeline 19 at the upstream ends and the downstream ends of the junction portions to maintain communication therethrough between the slurry transport pipeline and the transport medium return pipe line, and valves 2-9 are mounted at opposite end portions of the transport pipeline 18 and the return water pipeline 19, to enable the return water pipeline 19 to be used as a slurry transport pipeline when an abnormal condition, such as blockage, occurs in the slurry transport pipeline 18. Pressure measuring sections 13-17, for sensing the presence of an abnormal condition in the transport pipeline 18, are mounted in the slurry transport pipeline 18 and supply signals representing the pressures measured to a controller 12 which analyzes the pressure signals and produces, when an abnormal condition is sensed, control signals which are fed to the slurry pump 1, the rewatering plant 11, the return water pump 10 and the valves 2-9 of the pipeline switching means, to enable switching of the pipelines 18 and 19 to be immediately effected.

Assuming that coal particles are accumulated on the bottom of the slurry transport pipeline 18 and a blockage thereof threatens to occur following a prolonged period of slurry transportation. Any of the signals produced by the pressure measuring sections 13–17 in the pipeline 18 fed to the controller 12 indicates a change in pressure in a portion of the pipeline 18 in which the accumulation of coal exists. Then the controller 12 produces a control signal which closes the valves 2, 5, 6 and 9 and opens the valves 3, 4, 7 and 8, so that the coarse coal slurry supplied by the slurry pump 1 will be diverted to flow through the pipe 45, return water pipeline 19 and pipe 48. Meanwhile the water treated at the rewatering plant 11 is returned through the pipe 47, slurry transport pipeline 18 and pipe 46 to the point of origin.

In the embodiment of the aforesaid construction, it is possible to continuously carry out slurry transport without interrupting the operation until a normal condition is restored, even if an abnormal condition, such as a blockage of the slurry transport pipeline 18, occurs. When there is a mass of solids in the slurry transport pipeline 18 tending to cause the blockage to occur, it is possible to flush water in a direction opposite the direction in which a slurry normally flows, to thereby enable excellent effects to be achieved in clearing the slurry transport pipeline 18 of accumulated solids to restore a normal condition to the pipeline 18.

The provision of the pipelines switching means offers the additional advantage that, even if the slurry transport system is operating normally without any trouble in the pipelines, the return water pipeline 19 can function as a slurry transport pipeline at regular intervals by actuating the pipelines switching means. As a result, the slurry transport pipeline 18 having coal particles accumulated therein can be cleaned and the service life of the pipeline that might otherwise be worn can be prolonged.

In the embodiment of FIG. 2, buster pumps are provided in the pipeline 18, with the pipeline 18 and 19 have the same pipeline switching means as shown in FIG. 1 and additionally having connecting pipes 63–72 and valves 2–9 and 24–37 mounted in portions of the pipelines 18 and 19 in which the buster pumps 43 and 44 are located. Assuming that the existence of an abnormal condition in the slurry transport pipeline 18 between the buster pumps 43 and 44 is detected, for example, when the operation of transporting a coarse coal slurry through the pipeline 18 is performed, then the valves 30, 27, 31 and 34 are closed and the valves 26, 28, 32 and 34 are opened. This enables the coarse coal slurry to bypass a portion of the pipeline 18 in which an abnormal condition has occured, to thereby enable slurry transport to be continuously performed without interruption.

FIG. In 3, the pipeline switching means are located, in addition to the opposite end portions of the pipelines 18 and 19 as described in the embodiment of FIG. 1, in some other portions of the pipelines 18 and 19 than the opposite end portions. In the FIG. 3, connecting pipes 50–57 and valves 20–35 are provided, and a coarse coal slurry is transported through the slurry transport pipeline 18 in one direction while water removed from the slurry or the mixture of coal and water is transported through the return pipeline 19 in another direction which is opposite the direction in which the slurry is transported. Assuming that any one of signals from the pressure measuring sections 13–17 and 58–62 fed to the controller 12 indicates that a blockage of the pipeline 18 might occur in a portion thereof between the pressure measuring sections 59 and 60, for example. The controller 12 produces a control signal to render inoperative the slurry pump 1 and return water pump 10 and close the sluice valves 24 and 28 at opposite ends of the portion of the pipeline 18 in which the blockage threatens to occur. Then the valves 25 ana 29 are opened to reactuate the slurry pump which supplies only water to the pipeline 18 to flush water through other portion of the pipeline 18 than the portion between the valves 24 and 28 in which the blockage threatens to occur, to thereby remove the slurry from such portion of the pipeline 18 and fill same with water. Thereafter, the valves 25 and 29 are closed and the valves 24 and 28 are opened, to thereby remove the slurry in the transport pipeline 18 therefrom by the slurry pump 1. In the embodiment of FIG. 3, it is possible, when blocking threatens to occur in some portion of the slurry transport pipeline 18 and difficulties are experienced in coping with the situation only by using the slurry transport pipeline 18, to remove the slurry by flushed water from another portion of the pipeline 18 than the portion having poor fluidity because of the impending blockage and fill such portion of the pipeline 18 with water of high fluidity, because it is possible to use a portion of the return water pipeline 19 as a slurry transport pipeline by utilizing some of the pipelines switching means mounted in the pipelines. By feeding water under pressure from the slurry pump 1 to the portion of the pipeline 18 in which the blockage threatens to occur after the aforesaid operation has been performed, it is possible to readily remove from such portion of the pipeline 18 the accumulated mass of coal tending to cause the blockage of the pipeline 18 to take place, thereby enabling excellent results to be achieved in eliminating the trouble of the pipeline 18 being blocked.

According to the invention, it is possible to readily effect switching of the transport pipeline 18 for transporting a slurry and the return water pipeline 19 for returning to the point of origin water removed from the slurry which is a mixture of coal and water by actuating lines switching means. The invention can achieve the following advantageous results:

When a blockage threatens to occur in the slurry transport pipeline 18, it is possible to automatically sense the impending trouble and switch the whole or a portion of the return water pipeline 19 for use as a transport pipeline for transporting the slurry, to thereby enable the working ratio of the pipelines for slurry transport to be kept at a predetermined level.

When switching of the pipelines is effected as described above, the slurry can be transported by bypassing the portion of the slurry transport pipeline 18 in which the blockage threatens to occur and at the same time, water removed from the slurry or the mixture of coal and water can flow through the portion of the transport pipeline in which the blockage threatens to occur in a direction opposite the direction in which the slurry is normally transported, so that the mass of solids accumulated on the bottom of the slurry transport pipeline 18 can be washed away and the impending trouble of the slurry transport pipeline being blocked can be eliminated.

By effecting switching of the pipelines periodically to temporarily use the slurry transport pipeline 18 for transporting return water and the return water pipeline 19 for transporting a slurry to perform a slurry transporting operation continuously, it is possible to achieve the effect of cleaning the slurry transport pipeline in which solids have accumulated without interrupting the slurry transporting operation. This is conductive to a prolonged service life of the pipelines by minimizing wear caused thereon by the solids in the slurry.

What is claimed is:

1. A slurry transport system comprising:
   a transport pipeline for transporting a slurry therethrough;
   a return pipeline for returning to a point of origin a transport medium removed from the slurry, the slurry being a mixture of solids and the transport medium;
   detecting means mounted on said transport pipeline to detect an abnormal condition of said transport pipeline; and
   pipeline switching mens responsive to said detecting means and mounted in said transport pipeline and return pipeline to form a slurry transport and a transport medium return pass through the abnormal condition for enabling immediate switching of the pipelines for transportation of the slurry through said transport medium return pipeline while returning the transport medium to the point of origin through said slurry transport pipeline.

2. A slurry transport system as claimed in claim 1, wherein said pipeline switching means are mounted at least in two junction portions of said slurry transport pipeline and transport medium return pipeline, each of said pipeline switching means comprising a plurality of connecting pipes for connecting said slurry transport pipeline and transport medium return pipeline at upstream ends and downstream ends of said junction portions to maintain communication therethrough between the slurry transport pipeline and the transport medium return pipeline, and a plurality of sluice valves each mounted in one of said connecting pipes.

3. A slurry transport system as claimed in claim 1, wherein said pipeline switching means are respectively located at least at a starting end portion and a terminating end portion of said slurry transport pipeline.

* * * * *